United States Patent
Michels et al.

(10) Patent No.: US 11,772,626 B2
(45) Date of Patent: Oct. 3, 2023

(54) BRAKE LINING WEAR DETECTION WITH EFFICIENT SIGNAL TRANSMISSION

(71) Applicant: ZF Active Safety GmbH, Koblenz (DE)

(72) Inventors: Erwin Michels, Kail (DE); Benedikt Ohlig, Vallendar (DE); Lutz Muders, Oberheimbach (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 803 days.

(21) Appl. No.: 16/614,817

(22) PCT Filed: Apr. 20, 2018

(86) PCT No.: PCT/EP2018/060157
§ 371 (c)(1),
(2) Date: Nov. 19, 2019

(87) PCT Pub. No.: WO2018/215146
PCT Pub. Date: Nov. 29, 2018

(65) Prior Publication Data
US 2020/0307541 A1    Oct. 1, 2020

(30) Foreign Application Priority Data
May 22, 2017 (DE) .......... 102017004890.8

(51) Int. Cl.
*B60T 17/22* (2006.01)
*F16D 65/16* (2006.01)
(Continued)

(52) U.S. Cl.
CPC ............ *B60T 17/221* (2013.01); *F16D 65/16* (2013.01); *F16D 66/027* (2013.01); *B60T 13/741* (2013.01);
(Continued)

(58) Field of Classification Search
CPC ................. B60T 17/221; B60T 13/741; B60T 2240/00; B60T 2250/00; B60T 2270/30;
(Continued)

(56) References Cited

U.S. PATENT DOCUMENTS 5,825,287 A * 10/1998 Zarybnicky, Sr. .... F16D 66/028
340/453
6,512,453 B1 * 1/2003 Leiber ...................... B60T 8/32
340/439
(Continued)

FOREIGN PATENT DOCUMENTS

DE    4322440 C1    2/1995
DE    19732168 C1   1/1999
(Continued)

*Primary Examiner* — Pamela Rodriguez
(74) *Attorney, Agent, or Firm* — Robert James Harwood (57) ABSTRACT

A method for brake lining wear detection is disclosed. The method comprises detecting a wear state of a brake lining installed in the area of a wheel housing and producing a state signal that indicates the wear state. The method also comprises coupling the state signal into at least one electrical line that leads to an evaluation unit for the state signal. The at least one electrical line also transmits at least one other signal from or to at least one other device installed in the area of the wheel housing.

18 Claims, 7 Drawing Sheets

(51) Int. Cl.
  *F16D 66/02* (2006.01)
  *B60T 13/74* (2006.01)
  *F16D 66/00* (2006.01)

(52) U.S. Cl.
  CPC ....... *B60T 2240/00* (2013.01); *B60T 2250/00* (2013.01); *B60T 2270/30* (2013.01); *F16D 2066/006* (2013.01)

(58) Field of Classification Search
  CPC ............... F16D 2066/006; F16D 65/16; F16D 66/027
  See application file for complete search history.

(56) References Cited

U.S. PATENT DOCUMENTS

| | | | |
|---|---|---|---|
| 10,550,905 B2* | 2/2020 | Koh | B60T 17/22 |
| 2006/0266598 A1* | 11/2006 | Baumgartner | F16D 55/226 188/72.7 |
| 2010/0283595 A1 | 11/2010 | Korecki et al. | |

FOREIGN PATENT DOCUMENTS

| | | | |
|---|---|---|---|
| DE | 10150047 A1 | | 6/2003 |
| DE | 69628379 T2 | | 2/2004 |
| GB | 2279713 A | * | 1/1995 |

* cited by examiner

BRAKE LINING WEAR DETECTION WITH EFFICIENT SIGNAL TRANSMISSION

CROSS-REFERENCE TO RELATED APPLICATION

This application is a national stage of International Application No. PCT/EP2018/060157, filed Apr. 20, 2018, the disclosure of which is incorporated herein by reference in its entirety, and which claimed priority to German Patent Application No. 102017004890.8, filed May 22, 2017, the disclosure of which is incorporated herein by reference in its entirety.

TECHNICAL FIELD

The present disclosure generally relates to the field of motor vehicle brake systems. Specifically, aspects will be described in connection with the brake lining wear detection.

BACKGROUND

Many modern motor vehicles with friction brake systems are equipped with a function for wear detection of the brake linings installed in the brake system. As part of a conventional braking process, the brake linings rub against brake discs so that the lining thickness decreases continuously. If the thickness falls below a predetermined minimum, then the affected brake lining must be replaced so as to maintain the full functionality of the brake system.

Known apparatuses for brake lining wear detection comprise a variety of sensor device types. For example, there are known sensor devices with switches, which, when the brake lining thickness falls below a minimum thickness, change their switch position and in this way, electrically signal that the brake lining must be replaced. Other apparatuses for brake lining wear detection are based on a resistance measurement across the thickness of the brake lining; with decreasing thickness, the resistance also changes correspondingly. When brake lining wear is detected, an optical or acoustical signal to the driver is issued.

The sensor devices for the brake lining wear detection are installed in the area of the wheel brakes and communicate with a central evaluation unit via electrical lines. The evaluation unit evaluates the sensor signals received via the electrical lines and if need be, prompts the issuance of the warning signal. The routing of the electrical lines from the decentralized sensor devices to the central evaluation unit clearly entails an immense amount of wiring complexity.

SUMMARY

The object of the present disclosure is to enable a more efficient implementation of brake lining wear detection. According to a first aspect, a method for brake lining wear detection is disclosed. The method comprises the steps of detecting a wear state of a brake lining installed in the area of a wheel housing, producing a state signal that indicates the wear state, and coupling of the state signal into at least one electrical line that leads to an evaluation unit for the state signal. The at least one electrical line transmits at least one other signal from or to at least one other device installed in the area of the wheel housing.

According to one variant, the state signal that indicates the wear state and the signal transmitted from or to the other device can be transmitted at different times via the at least one electrical line. It is also conceivable for the state signal and the other signal, at least in some configurations, to be transmitted simultaneously via the at least one electrical line. Such configurations can, for example, exist when a brake lining wear is detected during a signaling from or to the at least one other device.

With a simultaneous transmission of the state signal and the other signal, the state signal can be modulated to the other signal. The state signal and the other signal can therefore have different frequencies, including a scenario in which one of the two signals is a DC voltage signal. The detection of the wear state can yield the result that no brake wear is present. Alternatively to this, the detection of the wear state can yield the result that brake wear is present.

The generation of the state signal that indicates the wear state can take place independent of the result of the state detection. In this case, the state signal is suitable, for example, for signaling at least two different states (wear is present/wear is not present). In another variant, the state signal is only generated if a brake lining wear has actually been detected. The absence of a state signal on the at least one electrical line therefore indicates that no brake lining wear has been detected. Naturally, a complementary implementation is possible in which the state signal is generated only if brake lining wear is not present. In this case, the lack of a signaling of the state signal on the at least one electrical line indicates the presence of brake lining wear.

The method can be carried out in parallel fashion on two or more wheel brakes. If the vehicle has a plurality of wheel brakes, though, the method does not have to be carried out on every wheel brake. The method can comprise one or more steps, as described below.

In addition, a computer program is disclosed, which comprises programming code for carrying out the method presented here when the programming code is run on a processor. Also disclosed is a motor vehicle control unit or a system comprising a plurality of such control units, which comprises (at least) one processor for performing the method presented here, and a memory coupled to the processor, on which the corresponding computer program is stored.

According to another aspect, an apparatus for brake lining wear detection is disclosed. The apparatus comprises a first sensor device, which is embodied to detect a wear state of a brake lining that is installed in the area of a wheel housing. The apparatus also comprises a signaling device, which is coupled to the sensor device and is embodied to generate a state signal that indicates the wear state. The apparatus also comprises a coupling device, which is embodied to couple the state signal into at least one electrical line, which is electrically connected to an evaluation unit for the state signal. The at least one electrical line is also electrically connected to another device installed in the area of the wheel housing.

The apparatus can be embodied to carry out the method described here. This relates in particular to the aspects described above and below relating to detecting the wear state, producing the state signal, and coupling the state signal into the one or more electrical lines. The first sensor device can be based on a wide variety of principles. The sensor device can, for example, be based on a resistance measurement, breaking of an electrical contact, making of an electrical contact, etc.

According to one variant, the apparatus also includes the at least one electrical line. In particular, the apparatus can comprise exactly one electrical line, which in turn comprises two electrical conductors, with the coupling device being connected to one of the two electrical conductors or to both of them in a signal-coupling fashion.

The first sensor device can comprise a switch device. The switch device can be embodied to switch from a first switch state into a second switch state when wear is detected. The switching from the first switch state into the second switch state can include the breaking or making of a circuit.

The signaling device can be embodied to generate the state signal depending on the switch state of the switch device. The state signal can, for example, be generated only in the first switch state, but not in the second or vice versa. The signaling device can be embodied to generate the state signal in the form of a high-frequency signal. The high-frequency signal can have a frequency in the MHz range. The coupling device can be embodied to couple the high-frequency signal into the at least one electrical line. In the event of the simultaneous presence of the other signal, the high-frequency signal can be modulated to it. In general, the signaling device can comprise a complex electrical network, which is embodied to generate the state signal. The complex electrical network in turn can comprise a resonator. The resonator can be connected in series with the switch device of the first sensor device so that the resonator is active or inactive depending on the switch state of the switch device.

The apparatus presented here can also comprise the evaluation unit, which is embodied to evaluate the state signal. The evaluation unit can comprise a processor. According to one implementation, the evaluation unit is implemented in a control unit or as a control unit. The evaluation unit can generally be provided to process the state signal that indicates the wear state and depending on the result of this processing, to generate a warning signal or to prompt the generation of such a warning signal.

The coupling device can be embodied in different ways. According to one variant, the coupling device comprises an electrical connection between the signaling device and the at least one electrical line. In this way, the coupling device can comprise a conductor section, which extends from the at least one electrical line to the signaling device.

Also disclosed is an electrical plug connector. The electrical plug connector includes a housing and at least a part (e.g. the signaling device) of the apparatus for brake lining wear detection presented here, which is accommodated in the housing. The plug connector also includes at least one electrical contact that is embodied as being connected to—or intended for connection to—the at least one electrical line.

According to another aspect, a system is disclosed, which comprises the apparatus for brake lining wear detection presented here or the electrical plug connector presented here as well as the at least one other device.

According to one variant, the at least one electrical line comprises two electrical conductors extending parallel to each other. In this case, the at least one other device and at least a part of the apparatus for brake lining wear detection can be connected in parallel to each other with the two electrical lines. The at least one other device installed in the wheel housing can be an actuator. The actuator can be associated with an electric parking brake or a chassis control. It is also conceivable for the at least one other device to comprise a second sensor device. The second sensor device can be a wheel speed sensor or a sensor of a chassis control. The electrical plug connector presented here can be embodied for contacting at least one other device. If the other device is, for example, the actuator of an electric parking brake, then the plug connector can be provided to electrically connect the at least one electrical line to this actuator.

The system presented here can also have a control unit for the at least one other device. The control unit can be electrically connected to at least one electrical line and can comprise the evaluation unit.

BRIEF DESCRIPTION OF THE DRAWINGS

Other aspects, details, and advantages of the present disclosure ensue from the following description of exemplary embodiments and the figures. In the drawings.

DETAILED DESCRIPTION

In the following figures, components that are the same or similar have been provided with the same reference numerals.

Figure 1:
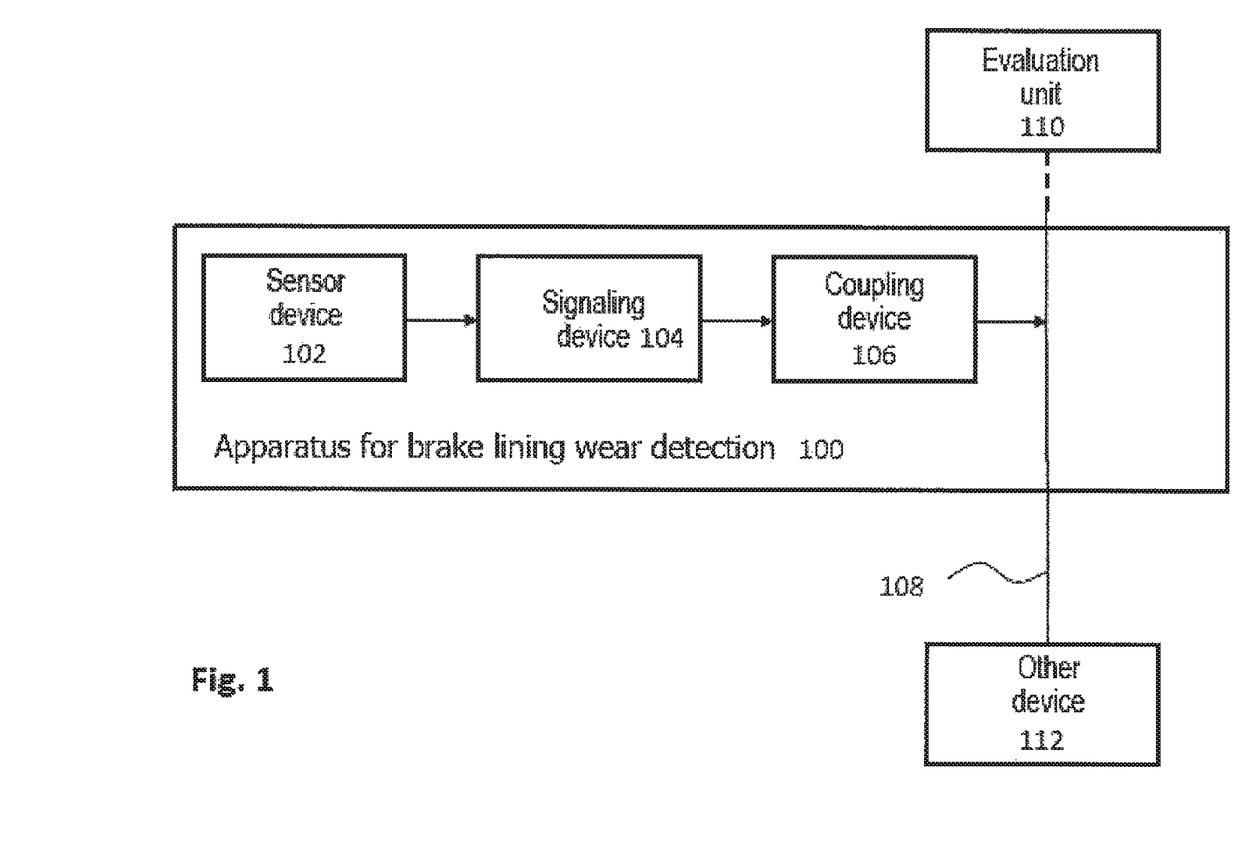
FIG. 1 shows a block circuit diagram of an exemplary embodiment of an apparatus for brake lining wear detection.

FIG. 1 shows an exemplary embodiment of an apparatus 100 for brake lining wear detection. As shown in FIG. 1, the apparatus 100 comprises a sensor device 102, a signaling device 104, and a coupling device 106. The sensor device 102 is embodied to detect a wear state of a brake lining installed in the area of a wheel housing. For this purpose, the sensor device 102 can, for example, comprise a switch device that is integrated into the brake lining and switches from a first switch state into a second switch state when wear is detected. The sensor device 102, however, can also be based on other principles, for example a resistance measurement across the thickness of the brake lining.

The signaling device 104 is embodied to generate a state signal that indicates the wear state detected by the sensor device 102. The state signal can, for example, be a DC current signal or an AC current signal (in particular a high-frequency signal). In some embodiments, the signaling device 104 can form a functional unit with the sensor device 102 or these devices can have shared components. If, for example, the sensor device 102 comprises a switch device, then the signaling device 104 can comprise a voltage source, which generates a DC voltage signal or AC voltage signal (or does not generate it) depending on the switch state of the switch device. The coupling device 106 is embodied to couple the state signal generated by the signaling device 104 into an electrical line 108. The electrical line 108 can comprise one or more separate electrical conductors.

As shown in FIG. 1, the electrical line 108 is electrically connected to both an evaluation unit 110 and another device 112. The evaluation unit 110 can also constitute a part of the apparatus 100 for brake lining wear detection. It should also be noted, however, that the components of the apparatus 100 and evaluation unit 110 shown in FIG. 1 can be installed in spatially separate places in the vehicle. It should also be noted that the evaluation unit 110 can be responsible for multiple assemblies that are each composed of a sensor device 102, a signaling device 104, and a coupling device 106. Thus, a single, centrally located evaluation unit 110 can evaluate the state signals from a plurality of such assemblies. For example, in a motor vehicle with four wheel brakes, four such assemblies can be connected to a single evaluation unit 110 via electrical lines that extend separately in at least some areas.

The evaluation unit 110 is generally provided to evaluate the state signal of each individual combination of a sensor device 102, signaling device 104, and coupling device 106 as to whether the respective assembly is signaling the presence of a brake lining wear. If wear is present, then the evaluation unit 110 issues a warning signal to the driver. This warning signal can be an acoustic signal and/or an optical signal.

As shown in FIG. 1, at least one other device 112 is electrically connected to the electrical line 108. This other device 112 is installed in the area of the same wheel housing in which the apparatus 100 for brake lining wear detection is installed, which is connected to the line 108. In other words, the apparatus 100 for brake lining wear detection and the other device 112 share the electrical line 108, which significantly reduces the wiring complexity in the motor vehicle. The other device 112 can, for example, be the actuator of an electric parking brake or the actuator of a chassis control. It is also conceivable for the other device 112 to be a wheel speed sensor or a sensor of a chassis control.

The electrical line 108 can be coupled to another component (for example a control unit, not shown), which evaluates a signal generated by the other device 112 or generates a signal for triggering the other device 112. The corresponding component can be provided together with the evaluation unit 110 in a shared housing or can be provided in a way that is structurally separate from the evaluation unit 110.

Figure 2:
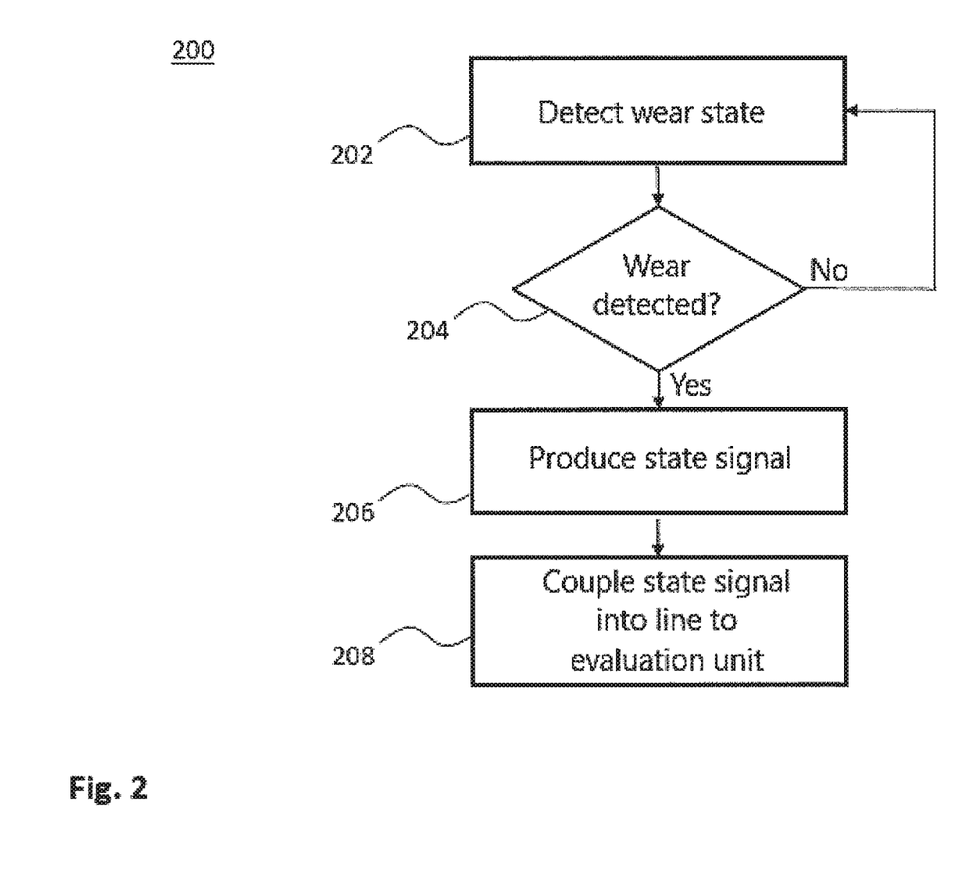
FIG. 2 shows a flowchart of an exemplary embodiment of a method for brake lining wear detection.

FIG. 2 is a flowchart 200 showing an exemplary embodiment of a method for brake lining wear detection. The method according to FIG. 2 is explained below with reference to the apparatus according to FIG. 1, but can also be carried out by a differently configured apparatus for brake lining wear detection.

In step 202, the sensor device 102 detects the wear state of a brake lining associated with the sensor device 102. The wear state detected by the sensor device 102 in step 202 is continuously checked in a step 204 for whether the presence of a brake lining wear has been detected. If this is not the case, then the method loops back to step 202. But if in step 204, a brake lining wear is detected, then the method continues with step 206. In step 206, the signaling device 104 generates a state signal, which indicates the presence of brake lining wear in the wheel brake that is associated with this sensor device 102. In another variant, the state signal is generated continuously. Then in step 206, only the content of the state signal is changed, namely from "no wear is present" to "wear is present."

In step 208, the state signal that indicates the brake lining wear is coupled by the coupling device 106 into the electrical line 108. In another step not shown in FIG. 2, the state signal that indicates the brake lining wear is evaluated by the evaluation unit 110 and a corresponding warning signal is issued to a driver.

Figure 3:
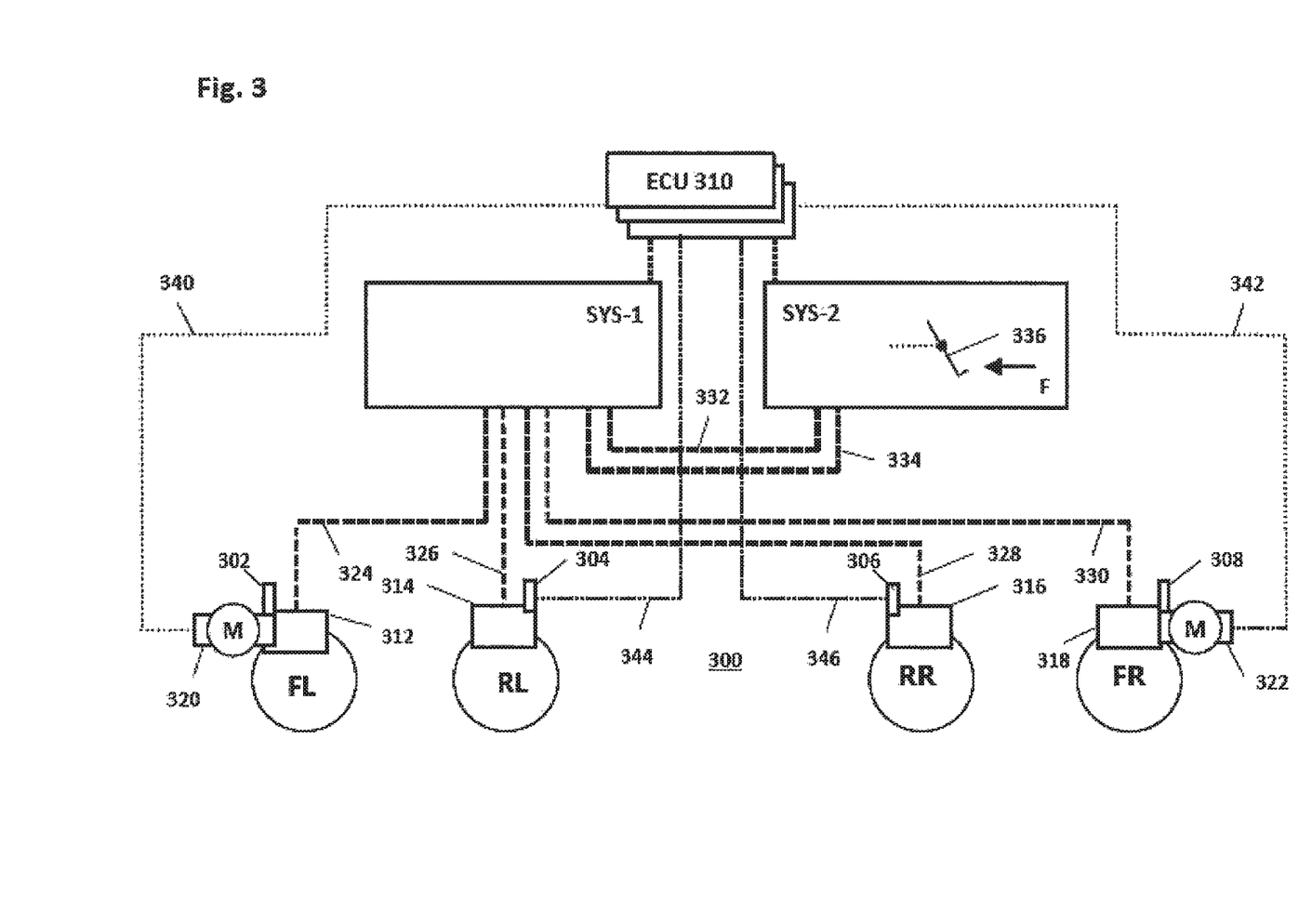
FIG. 3 shows a block circuit diagram of an exemplary embodiment of a brake system with apparatuses for brake lining wear detection.

FIG. 3 schematically depicts a motor vehicle brake system 300 for brake lining wear detection. The motor vehicle brake system 300—in addition to the conventional components of a modern hydraulic friction brake system—comprises four apparatuses 302, 304, 306, 308 for brake lining wear detection and one or more electronic control units (ECUs) 310. The apparatuses 302, 304, 306, 308 can have the design shown in FIG. 1 and be embodied to perform the functions shown in FIG. 2.

The brake system 300 comprises a first subsystem SYS-1, a second subsystem SYS-2, four hydraulically actuatable wheel brakes 312, 314, 316, 318, and (at least) two actuators 320, 322 of an electric parking brake (EPB). Each of the two subsystems SYS-1 and SYS-2 and the at least two EPS actuators 320, 322 is embodied to generate a braking force on at least a subset of the four wheel brakes 312, 314, 316, 318.

The four wheel brakes 312, 314, 316, 318 each comprise a brake disc and two respective brake shoes that cooperate with the brake disc and can be actuated by a wheel brake cylinder (not shown). A replaceable brake lining is mounted on each brake shoe (likewise not shown). For example, each of the four wheel brakes 312, 314, 316, 318 can be embodied as a floating caliper brake. One of the four apparatuses 302, 304, 306, 308 for brake lining wear detection is installed in the area of each of the four wheel brakes 312, 314, 316, 318, i.e. in the wheel housing.

The at least one control unit 310 in the exemplary embodiment shown in FIG. 3 enables a triggering of the two subsystems SYS-1 and SYS-2 and of the at least two EPB actuators 320, 322 and an evaluation of the state signals of the apparatuses 302, 304, 306, 308. The triggering and evaluation tasks can also be distributed to two or more separate control units 310.

The first subsystem SYS-1 or more precisely stated, a hydraulic control unit (HCU) thereof, not shown in FIG. 3, is connected via a respective hydraulic line 324, 326, 328, 330 to a respective one of the wheel brakes 312, 314, 316, 318. In the exemplary embodiment, the first subsystem SYS-1 is a system, which enables a driver-independent, individual generation and control of brake pressures in the wheel brakes 312, 314, 316, 318. The first subsystem SYS-1 can, for example, implement an antilock brake system (ABS) and/or an electronic stability control (ESC).

The second subsystem SYS-2 is connected via hydraulic lines 332, 334 to the first subsystem SYS-1 and is embodied to generate brake pressures for the first subsystem SYS-1 and/or for the wheel brakes 312, 314, 316, 318. For producing hydraulic pressure, the second subsystem SYS-2 can comprise a master cylinder (not shown) that can be actuated by means of a brake pedal 336 and/or an electrically actuatable hydraulic pressure source (likewise not shown).

The two EPB actuators 320, 322 are provided in order to be able to securely keep the vehicle immobilized. In the exemplary embodiment, the two actuators 320, 322 are based on an electromagnetic principle and act on an actuating element in the form of the wheel brake cylinder associated with the respective wheel brake 312, 318. One variant of this principle is described in DE 197 32 168 A, whose disclosure content with regard to the design and function of the actuators 320, 322 is incorporated herein by reference.

In the exemplary embodiment, the one EPB actuator 320 acts on the wheel brake 312 associated with the front left wheel FL and the other EPB actuator 322 acts on the wheel brake 318 associated with the front right wheel FR since the front wheels FL, FR, due to the dynamic axle load distribution, are able to transmit a greater portion of the braking force than the rear wheels RL, RR. Naturally, in other exemplary embodiments, the two actuators 320 and 322 can also act on the wheel brakes 314, 316 associated with the rear wheels RL and RR of the vehicle. EPB actuators could also be provided in all four wheels FL, FR, RL, RR.

According to FIG. 3, the control unit 310 triggers the actuator 320 via a control line 340 and triggers the actuator 322 via a control line 344. An input device not shown in FIG. 3 (e.g. a switch or button) enables the driver to input his actuation command for a standard "park" mode in order to keep the vehicle at a permanent standstill. The actuation command—typically "engage parking brake" or "release parking brake"—is detected and evaluated by the control unit 310. According to the result of the evaluation, the control unit 310 then actuates the two actuators 320, 322.

It is also possible for the control unit 310 to actuate the EPB actuators 320, 322 independently of the actuation of the input device and thus independently of the driver's desired actuation. In addition, the EPB actuators 320, 322 can be triggered by the control unit 310 in order to perform braking maneuvers or emergency braking maneuvers automatically, particularly as a fallback level, for example, in a remote controlled parking operation.

The four apparatuses 302, 304, 306, 308 for brake lining wear detection are likewise connected via electrical lines to the control unit 310 (or to a separate other control unit). In this case, each of the two apparatuses 302 and 308 uses the corresponding control line 340 or 344 of the EPS actuator 320 or 322 associated with the same wheel brake 312, 318, whereas separate electrical lines 344 and 346, respectively, are provided for the two apparatuses 304 and 306. In an alternative embodiment, the two apparatuses 304 and 306 can each use the electrical line of another device installed in the area of the wheel housing, for example that of a wheel speed sensor.

Figure 4:
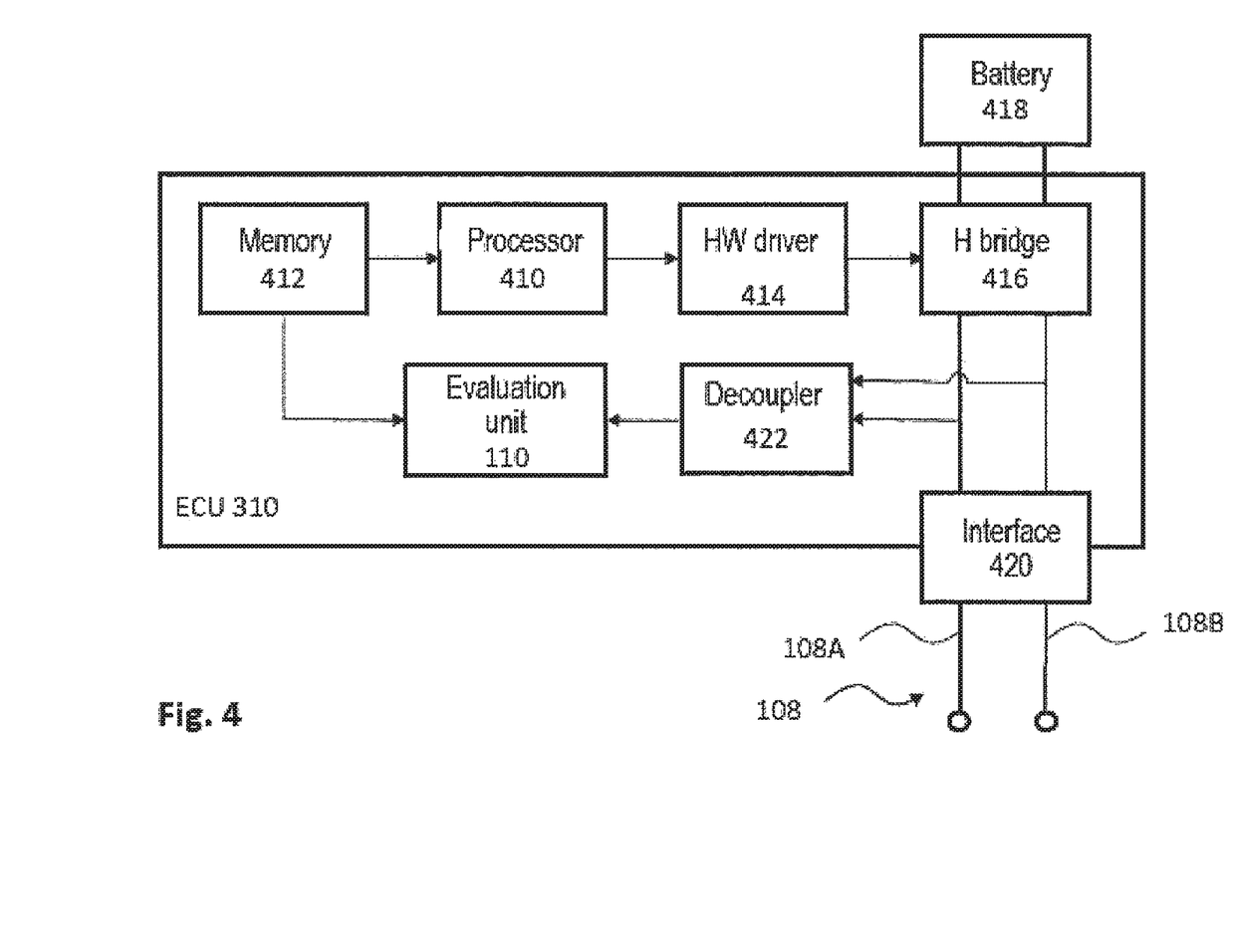
FIG. 4 shows a block circuit diagram of an exemplary embodiment of a control unit for brake lining wear detection.

FIG. 4 shows a schematic view of an exemplary embodiment of the control unit 310 from FIG. 3 for triggering the two EPS actuators 320, 322. Naturally, the functions of the control unit 310 described below with reference to FIG. 4 could also be distributed to a system composed of two or more control units 310. In particular, it is conceivable for each of the two EPB actuators 320, 322 to be associated with a separate control unit 310 for the sake of redundancy. Also, the four apparatuses 302, 304, 306, 308 for brake lining wear detection could each be associated with a separate control unit.

In the exemplary embodiment according to FIG. 4 the control unit 310 comprises a processor 410 and a memory 412 coupled to the processor 410. The memory 412 stores programming code, which can be executed by the processor 410 in connection with the triggering of the EPB actuators 320, 322. The memory 412 can also store programming code in connection with the brake lining wear detection (e.g. to perform at least some of the functions illustrated in FIG. 2).

For the triggering of the EPB actuators 320, 322, the control unit 310 comprises a hardware driver 414 coupled to the processor 410 as well as power electronics in the form of an H-bridge 416 comprising a plurality of power transistors. The hardware driver 414 is embodied to trigger the power transistors of the H-bridge 416 in accordance with a control signal received from the processor 410. This triggering can be based on pulse-width modulation in order to modulate speeds of motors installed in the EPS actuators 320, 322.

The H-bridge 416 is coupled via integrated connections of the control unit 310 (not shown in FIG. 4) to a battery 418 and thus to the electrical system of the motor vehicle. The H-bridge 416 makes it possible to switch on the supply voltage for the EPB actuators 320, 322 and to define the polarity of the supply voltage (and thus the rotation direction of the motors installed in the EPB actuators 320, 322).

The triggering signals generated by the H-bridge 416 are supplied to the EPB actuators 320, 322 (as supply signals) via a triggering interface 420 (e.g. a plug contact) of the control unit 310 and a control line 108 having two electrical conductors 108A, 108B). The processor 410, the hardware driver 414, and the H-bridge 416 together thus form a triggering circuit, which is embodied to generate triggering signals for the EPB actuators 320, 322. The EPB actuators 320, 322 are examples for other devices in the sense of FIG. 1 (same reference numeral 112).

As illustrated in FIG. 4, the control unit 310 also comprises a decoupler 422 and the evaluation unit 110 that has already been explained in connection with FIG. 1. The decoupler 422 is embodied to decouple the state signal generated by the apparatus 100 for brake lining wear detection from the electrical line 108 and to supply it to the evaluation unit 110. The evaluation unit 110 can comprise a separate processor or can also use the processor 410.

In the exemplary embodiment shown in FIG. 4, the triggering circuit for the EPB actuators 320, 322 and the evaluation unit 110 is provided with the associated decoupler 422 in a shared control unit 310. It would also be conceivable, however, for these two assemblies to be provided in separate control units. The corresponding control units can be accommodated in separate housings and connected to the electrical line 108 via separate interfaces (cf. reference numeral 420 in FIG. 4).

Figure 5:
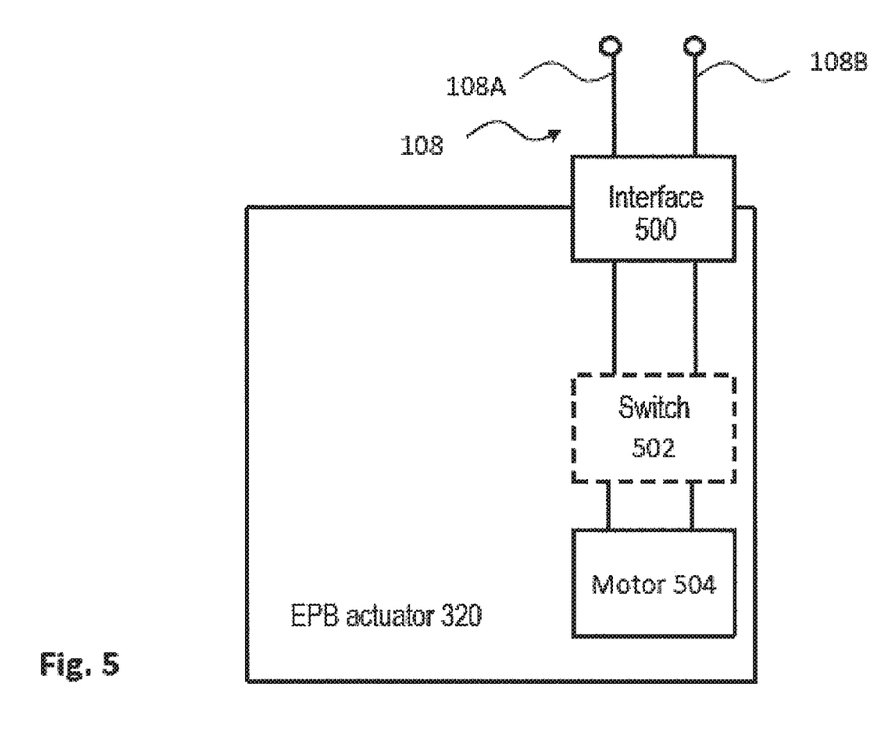
FIG. 5 shows a block circuit diagram of an exemplary embodiment of an actuator assembly with an apparatus for brake lining wear detection.

FIG. 5 shows an exemplary embodiment of the EPB actuator 320. The other EPB actuator 322 has the same design. As illustrated in FIG. 5, the EPB actuator 320 comprises an interface 500, an optional switch 502, and a motor 504.

The interface 500 serves to electrically connect the EPB actuator 320 to the electrical line 108. In one embodiment, the interface 500 is embodied as a combination of two complementary plug connectors, with one of the two plug connectors being mechanically coupled firmly to the electrical line 108 and the other of the two plug connectors being mechanically coupled firmly to the EPB actuator 320. At least a part of the apparatus 100 for brake lining wear detection according to FIG. 1, specifically the signaling device 104 and possibly a part of the coupling device 106, can be accommodated in one of these two plug connectors. The respective plug connector comprises (in addition to a housing) at least one electrical contact, which is embodied as connected to the electrical line 108 (if the plug connector is mechanically associated with the line 108) or intended for connection to it (if the plug connector is mechanically associated with the EPB actuator 320).

The optional switch 502 is embodied to selectively enable or disable a triggering of the motor 504. For this purpose, the control unit 310 shown in FIG. 4 can selectively modulate an enable signal or disable signal to the triggering signal provided for the motor 504 or can otherwise communicate with the switch 502.

And finally, the motor 504 is provided to trigger a wheel brake cylinder in accordance with a triggering signal of the control unit 310 according to FIG. 4 and via an interposed transmission.

Figure 6A:
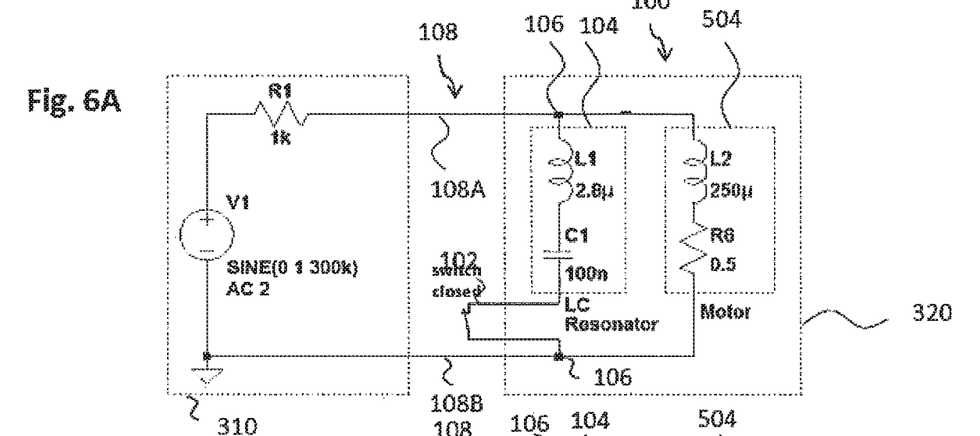
FIG. 6A shows an equivalent circuit diagram of an exemplary embodiment of a system for brake lining wear detection without brake lining wear detected.
Figure 6B:
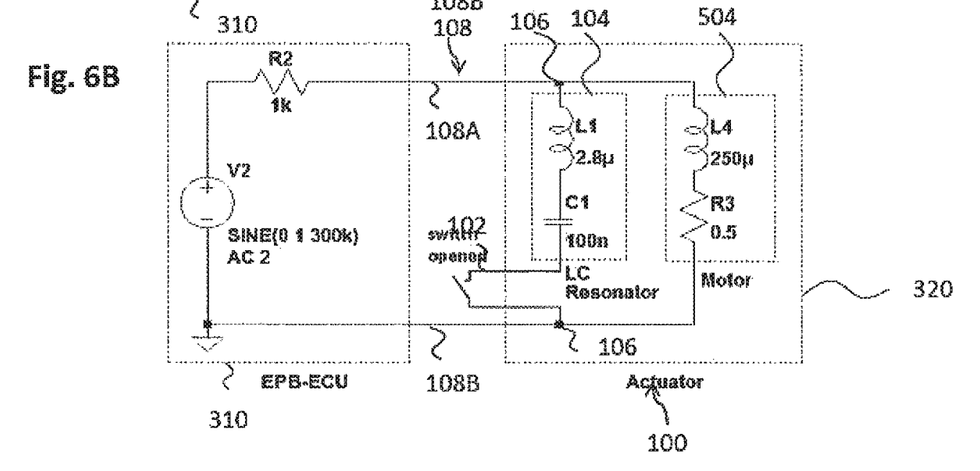
FIG. 6B shows an equivalent circuit diagram of an exemplary embodiment of a system for brake lining wear detection with brake lining wear detected.

FIGS. 6A and 6B show electrical equivalent circuit diagrams of the control unit 310 from FIG. 4 and the EPB actuator 320 from FIG. 5 when brake lining wear is not present (FIG. 6A) and when brake lining wear is present (FIG. 6B).

In the exemplary embodiment according to FIGS. 6A and 6B, the sensor device 102 comprises a switch device that switches from a closed switch state (FIG. 6A) to an open switch state (63) when brake lining wear is detected. The sensor device 102, or in any case its switch device, can be integrated into the brake lining to be inspected and can thus be provided outside the EPB actuator 320.

In the exemplary embodiment according to FIGS. 6A and 6B, the signaling device 104 includes a complex electrical network with an LC resonator, which, in the closed switch state of the sensor device 102, generates an AC current signal, in particular a high-frequency signal. The signaling device 104—independently of its specific design—can be integrated into the EPB actuator 102 itself (e.g. in the area of the plug connector comprised by the EPB actuator 102 for connecting the EPB actuator 320 to the line 108). Alternatively, to this, the signaling device 104 can be integrated into a plug connector attached to the line 108 with which the EPB actuator 102 is electrically contacted.

As illustrated in FIGS. 6A and 6B, the motor 504 of the EPB actuator 320 is provided in parallel to the serially connected arrangement of the sensor device 102 (with the switch device) and the signaling device 104 (with the resonator). In this instance, the coupling device 106 is embodied as a simple electrical contact, which electrically connects one end of the resonator of the signaling device 104 and an opposite end of the switch device of the sensor device 102 to two conductors 108A and 108E of the electrical line 108 extending parallel to each other.

Figure 7:
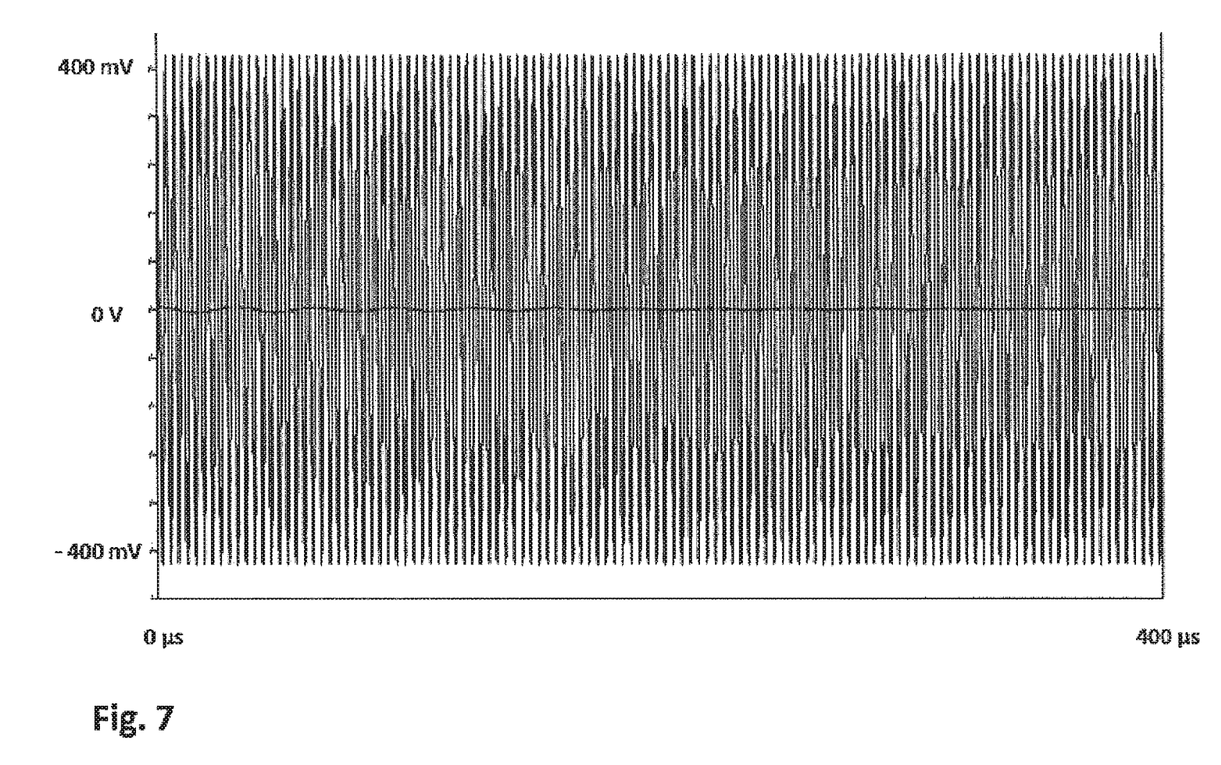
FIG. 7 shows a measurement diagram to illustrate an exemplary embodiment of a state signal.

FIG. 7 shows the state signal generated by the apparatus 100 for brake lining wear detection when no brake lining wear is present (FIG. 6A) and the switch device of the sensor device 102 therefore assumes a closed switch state. The state signal indicating that no brake lining wear is present is a high-frequency signal with a signal amplitude of approximately 400 mV. The state signal shown in FIG. 7 thus signals the evaluation unit 110 that no brake lining wear is present and thus that no warning signal needs to be issued to the driver.

But as soon as the switch device of the sensor device 102 assumes its open switch state according to FIG. 6B, then the resonator comprised by the signaling device 104 is no longer connected to the electrical circuit so that the state signal shown in FIG. 7 is no longer generated. The lack of the state signal is detected by the evaluation unit 110 and is taken as an indication of the presence of brake lining wear. A corresponding warning signal is thus generated and issued to the driver.

As is clear from the above description of the exemplary embodiments, in the embodiment for brake lining wear detection presented here, the wiring complexity is significantly reduced since the electrical line 108 is used not only for the signaling of the state signal that indicates the wear state, but is also used, for example, by an electric parking brake. This approach permits a significantly more efficient implementation of the brake lining wear detection.

The invention claimed is:

1. A method for brake lining wear detection, comprising the steps
    detecting a wear state of a brake lining installed in the vicinity of a wheel housing;
    producing a state signal that indicates the wear state; and
    coupling the state signal into at least one electrical line that leads to an evaluation unit for the state signal, wherein the at least one electrical line transmits at least one other signal from or to an actuator installed in the vicinity of the wheel housing.

2. The method according to claim 1, wherein the actuator is an EPB brake actuator and the at least one other signal comprises a triggering signal for actuating the EPB brake actuator.

3. The method according to claim 1, further comprising decoupling the state signal from the at least one other signal prior to the state signal reaching the evaluation unit.

4. A method for brake lining wear detection, comprising the steps
    detecting a wear state of a brake lining installed in the vicinity of a wheel housing;
    producing a state signal that indicates the wear state; and
    coupling the state signal into at least one electrical line that leads to an evaluation unit for the state signal, wherein the at least one electrical line transmits at least one other signal from or to at least one other device installed in the vicinity of the wheel housing, wherein the state signal is modulated to the at least one other signal.

5. The method according to claim 4, further comprising decoupling the state signal from the at least one other signal prior to the state signal reaching the evaluation unit.

6. An apparatus for brake lining wear detection, comprising
    a first sensor device, which is embodied to detect a wear state of a brake lining installed in the vicinity of a wheel housing;
    a signaling device, which is coupled to the first sensor device and is embodied to produce a state signal that indicates the wear state; and
    a coupling device, which is embodied to couple the state signal into at least one electrical line that is electrically connected to an evaluation unit for the state signal, wherein the at least one electrical line is also electrically connected to and transmits at least one other signal from or to an actuator installed in the vicinity of the wheel housing.

7. The apparatus according to claim 6, wherein the first sensor device comprises a switch device that switches from a first switch state into a second switch state when wear is detected.

8. The apparatus according to claim 7, wherein the signaling device is embodied to produce the state signal depending on the switch state of the switch device.

9. The apparatus according to claim 6, wherein the signaling device is embodied to produce the state signal in the form of a high-frequency signal.

10. The apparatus according to claim 6, wherein the signaling device comprises a complex electrical network that is embodied to produce the state signal.

11. The apparatus according to claim 6, also comprising the evaluation unit, which is embodied to evaluate the state signal.

12. The apparatus according to claim 6, wherein the coupling device comprises an electrical connection between the signaling device and the at least one electrical line.

13. An electrical plug connector, comprising
a housing;
at least a part of the apparatus for brake lining wear detection according to claim 6, which is accommodated in the housing; and
at least one electrical contact intended for connection to the at least one electrical line.

14. The system according to claim 6, wherein the at least one electrical line comprises two electrical conductors extending in parallel to each other; and the actuator and at least a part of the apparatus for brake lining wear detection are connected in parallel to each other with the two electrical conductors.

15. The system according to claim 6, wherein the actuator is associated with an electric parking brake or a chassis control.

16. The system according to claim 6, also comprising a control unit for the actuator, which is electrically connected to the at least one electrical line and comprises the evaluation unit.

17. The system according to claim 6, wherein the actuator is an EPB brake actuator and the at least one other signal comprises a triggering signal for actuating the EPB brake actuator.

18. The system according to claim 6, further comprising a decoupling device configured to decouple the state signal from the at least one other signal prior to the state signal reaching the evaluation unit.

* * * * *